United States Patent
Ramasamy et al.

(10) Patent No.: US 12,213,015 B2
(45) Date of Patent: *Jan. 28, 2025

(54) SYSTEM AND METHOD FOR TUNING ANTENNAS USING QUALITY OF SERVICE MANAGEMENT AND RECEIVED ACCESS POINT TELEMETRY

(71) Applicant: Dell Products, LP, Round Rock, TX (US)

(72) Inventors: Suresh K. Ramasamy, Cedar Park, TX (US); Harpreet S. Narula, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,110

(22) Filed: Nov. 13, 2023

(65) Prior Publication Data

US 2024/0080731 A1    Mar. 7, 2024

Related U.S. Application Data

(63) Continuation of application No. 17/511,446, filed on Oct. 26, 2021, now Pat. No. 11,818,616.

(51) Int. Cl.
*H04W 36/06* (2009.01)
*H04L 5/00* (2006.01)
*H04W 36/30* (2009.01)
*H04W 72/0453* (2023.01)

(52) U.S. Cl.
CPC ............. *H04W 36/06* (2013.01); *H04L 5/006* (2013.01); *H04L 5/0073* (2013.01); *H04W 36/304* (2023.05); *H04W 72/0453* (2013.01)

(58) Field of Classification Search
CPC . H04W 36/06; H04W 36/30; H04W 72/0453; H04W 36/302; H04W 84/12; H04L 5/006; H04L 5/0073
See application file for complete search history.

(56) References Cited

U.S. PATENT DOCUMENTS

| | | | |
|---|---|---|---|
| 2016/0353382 A1* | 12/2016 | Xue | H04W 52/0251 |
| 2018/0206143 A1 | 7/2018 | Patil | |
| 2018/0338315 A1 | 11/2018 | Chen | |
| 2020/0412417 A1 | 12/2020 | Calzolari | |

(Continued)

*Primary Examiner* — Ricky Q Ngo
*Assistant Examiner* — Kabir U Jahangir
(74) *Attorney, Agent, or Firm* — Prol Intellectual Property Law, PLLC; H. Kenneth Prol

(57) ABSTRACT

An information handling system and method is disclosed comprising a processor, a memory, a power management unit (PMU), at least one tunable antenna, and an antenna controller executing code instructions configured to receive access point (AP) telemetry information from one or more wireless APs, wherein the AP telemetry information is received within a fast initial link setup (FILS) discovery beacon frame including the AP telemetry information, determine a band/channel score for a plurality of radiofrequency bands and channels available for the wireless adapter to access the one or more wireless APs, receive local telemetry at the information handling system, and determine a recommendation for a band/channel change for the wireless adapter and trigger a band or antenna switching in accordance with the recommendation.

20 Claims, 6 Drawing Sheets

(56) References Cited

U.S. PATENT DOCUMENTS

2021/0235460 A1    7/2021  Bendigeri
2023/0262789 A1*   8/2023  Inohiza ................ H04W 8/005
                                                        370/329

* cited by examiner

SYSTEM AND METHOD FOR TUNING ANTENNAS USING QUALITY OF SERVICE MANAGEMENT AND RECEIVED ACCESS POINT TELEMETRY

This application is a continuation of prior application Ser. No. 17/511,446, entitled "SYSTEM AND METHOD FOR TUNING ANTENNAS USING QUALITY OF SERVICE MANAGEMENT AND RECEIVED ACCESS POINT TELEMETRY," filed on Oct. 26, 2021, which is assigned to the current assignee hereof and is incorporated herein by reference in its entirety.

FIELD OF THE DISCLOSURE

The present disclosure generally relates to an information handling system having one or more wireless antennas for use with wireless communication networks. More particularly, the present disclosure relates to monitoring and managing antenna tuning of plural antennas for an information handling system operating with a plurality of wireless local area network bands.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities, for example via wireless local area network (WLAN) protocols.

A typical information handling system may include a plurality of antennas that may be used to connect wirelessly to various networks. Depending on the location of the antennas within the information handling system and how the user is using the information handling system, connectivity to the antennas may be switched therebetween. As such, there is a need to actively manage the antennas within the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
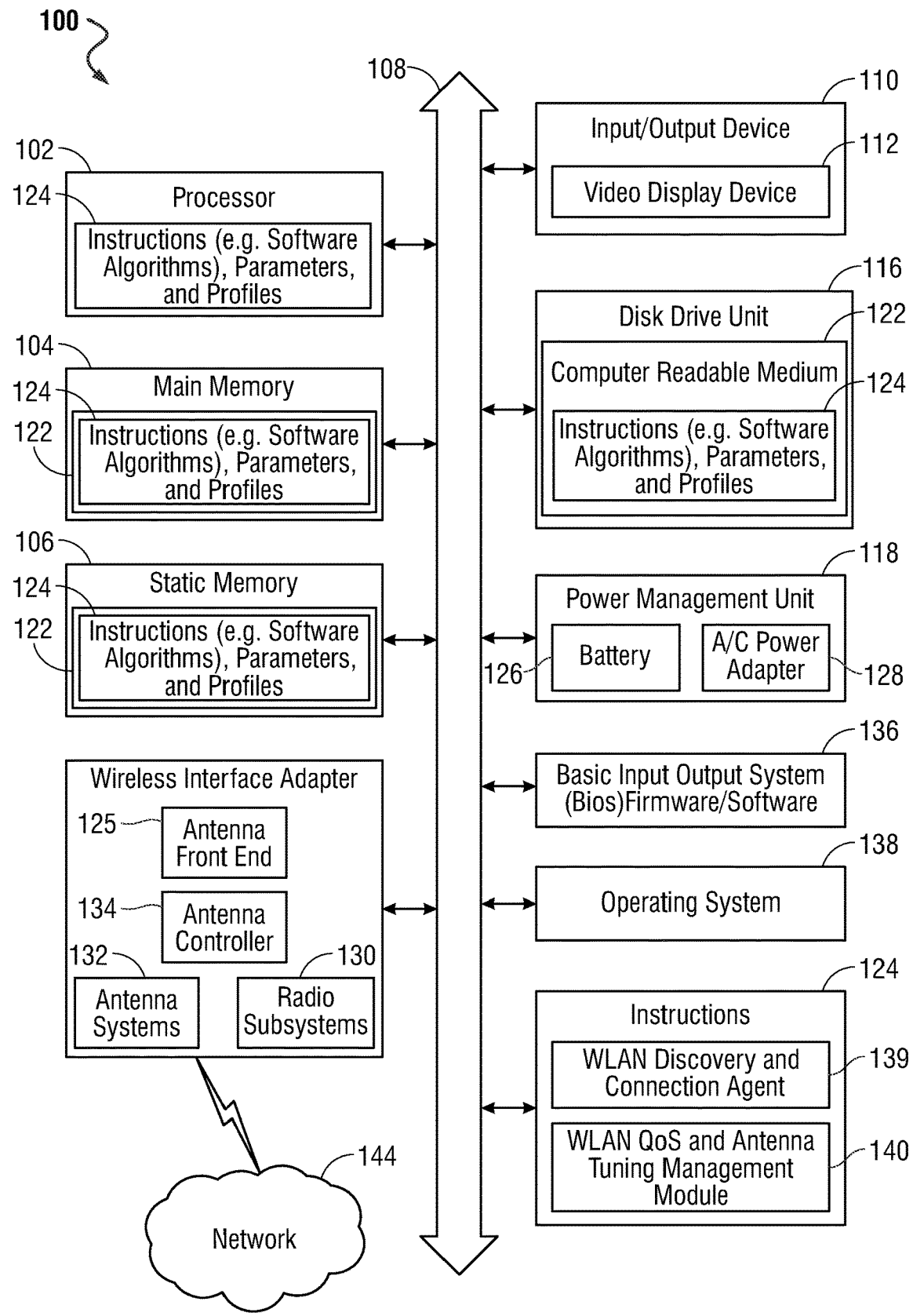
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A typical information handling system may include several antennas. Managing these antennas is necessary for the proper communication of the information handling system with network access points. A WLAN quality of service (QoS) and antenna tuning management module may be used to determine local antenna telemetry information, parse access point telemetry information, perform link quality metrics, determine proximity detection blockage, system orientation, or and trigger antenna tuning when a wireless link quality degradation is detected and match that up with channel and band conditions of WLAN access points within range and reporting telemetry to the user information handling system. In a particular embodiment, in a multi-access point environment, an access point (AP) may monitor the network conditions, including neighbor access point reports.

Under IEEE 802.11 standards, a fast initial link setup (FILS) system is available whereby passive (AP) discovery is made available with FILS discovery frames or beacons advertised to user information handling systems within range. Additionally, other WLAN frames exchanged between the WLAN APs and user information handling systems may be used to determine band or channel changes relating to APs connected to an information handling system, for example multi-band optimization and optimized connectivity experience (OCE-MBO) information element aspects of exchanged frames within active Wi-Fi channels. An information handling system may include local system management software, such as Dell Optimizer® to monitor systems within the user information handling system. This local system management software may gather telemetry from components and software operating on the user information handling system. This telemetry data may include telemetry relating to operation of wireless interface adapters including radio systems, antennas, and wireless link telemetry for plural WLAN protocol radio systems. The local system management software in some embodiments may also link to remote management for additional telemetry reporting, system management or control in some embodiments for a user information handling system. Further, as a part of this local system management software, a WLAN discovery and connection agent software may operate to enable intelligent, speedy network connectivity and to optimize network usage in an embodiment. In an example, such a WLAN discovery and connection agent may include a system such as Dell® Express Connect software system. The WLAN discovery and connection agent software may receive and process this FILS discovery frames and beacons under the updated IEEE 802.11 standards such as for Wi-Fi 6 and 6E. Further, OCE-MBO information element WLAN frames may be received at an antenna controller via a Wi-Fi wireless link indicating band and channel information with active APs within range of a user information handling system. While the FILS discovery beacon frames, as modified with AP telemetry data, may be limited on data space available for AP telemetry information, they are more frequent and provide capability for more current, up-to date AP telemetry data to be received useful for closed loop control for antenna tuning. Standard WLAN frames for band and channel data such as OCE-MBO information element WLAN frames may contain baseline information relating to bands and channels at AP and neighbor APs.

In an embodiment herein, the modified FILS discovery frame or FILS beacon may be used to provide telemetry data from advertising APs and further gathered from neighbor APs, and provided to a user information handling system. The AP may communicate using fast initial link setup (FILS) discovery frames as mini beacons that include. The advantage of the FILS beacons are that they are sent four times faster than typical wireless local area network (WLAN) beacons and may carry only information relevant to the network conditions, thus avoiding overhead in the typical beacons. In an embodiment, the FILS beacons may be used in addition to WLAN beacons, such as the OCE-MBO information element WLAN frames, and may enable fast telemetry between one or more APs, via at least one AP that may gather and include information about neighboring APs, and the user information handling system. AP telemetry data provided may include information about channel utilization for AP channels, dynamic bandwidth selection systems utilized to accommodate plural user devices in the area accessing the AP, Wi-Fi noise to the APs and other factors to allow alignment with conditions detected at the user information handling system to select channels, select bands or WLAN radios to use, or to modify tuning of the plural antennas on the user information handling system.

In a further aspect, if a WLAN QoS and antenna tuning management module determines that an tuning adjustment or selection of different WLAN communication band or channel is warranted based on local configuration, local telemetry, proximity sensor (P-sensor) data, and received AP telemetry data for the AP and neighboring APs in an embodiment, an antenna controller may be utilized to use the OCE-MBO information element (OCE-MBO IE) frames to request band/channel change information to an AP or neighbor AP to provide optimized connectivity in alignment with substantially fast antenna tuning conducted by the antenna controller to tune among the available WLAN antennas on the user information handling system. Antenna tuning may be triggered, or actuated, by the information handling system due to link quality degradation detected, orientation or P-sensor information that indicates pending link quality is degrading. Further, antenna tuning may be triggered, or actuated, by the detection of roaming of the information handling system by the access point in an embodiment. In an embodiment, antenna tuning may accommodate intra-channel selection and tuning or may utilize intra-band tuning to select antenna efficiency for radiofrequency bandwidths, for example shifting antenna efficiency between five gigahertz (5 GHz) and six gigahertz (6 GHz) using access point link telemetry and type of WLAN radio to be utilized based on local telemetry and received AP telemetry.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic information handling system, a network server or storage device, a network router, switch, or bridge, wireless router, or other network communication information handling system, a network connected device (cellular telephone, tablet information handling system, etc.), IoT computing device, wearable computing device, a set-top box (STB), a mobile device, a palmtop computer, a laptop computer, a desktop computer, a communications device, an access point (AP), a base station transceiver, a wireless telephone, a control system, a camera, a scanner, a printer, a personal device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic information handling systems that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, and drive unit 116 (volatile (e.g., random-access memory, etc.), nonvolatile (read-only memory, flash memory etc.) or any combination thereof) with computer readable medium 122 storing instructions 124 of a WLAN QoS and antenna tuning management module 140, a local system management software, or a WLAN discovery and connection agent software 139 according to embodiments herein. The information handling system 100 can also include one or more buses 108 operable to transmit communications between the various hardware components such as any combination of various input and output (I/O) devices.

As shown, the information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include an alpha numeric input device 112, such as a keyboard, and/or a cursor control device, such as a mouse, touchpad, or gesture or touch screen input device. The information handling system 100 can also include a disk drive unit 116.

The network interface device shown as wireless interface adapter 120 can provide connectivity to a network 144, e.g., a wide area network (WAN), a local area network (LAN), wireless local area network (WLAN), a wireless personal area network (WPAN), a wireless wide area network (WWAN), or another network. In an embodiment, the WAN, WWAN, LAN, and WLAN may each include an access point used to operatively couple the information handling system 100 to a network. In a specific embodiment, the network 144 be accessed via wireless links by the wireless interface adapter 120 through connections via one or more wireless access points (e.g., Wi-Fi or WiGig), or such as through licensed or unlicensed WWAN small cell base stations or macro-cellular base stations in various embodiments.

Connectivity may be via wired or wireless connection. Wireless interface adapter 120 may include one or more radio subsystems 130 with transmitter/receiver circuitry, modem circuitry, one or more radio frequency front end circuits 125, one or more wireless controller circuits such as antenna controller 134, amplifiers, antenna systems 132 and other circuitry of the wireless interface adapter 120 such as one or more antenna ports used for wireless communications via multiple radio access technologies. Each radio subsystem 130 may communicate with one or more wireless technology protocols. For example, radio subsystems 130 may support plural WLAN wireless protocols such as Wi-Fi, Wi-Fi 6, or Wi-Fi 6E protocols in some embodiments of the present disclosure. The radio subsystem 130 may contain individual subscriber identity module (SIM) profiles for each technology requiring subscription with a service provider and their available protocols for any operating subscriber-based radio access technologies such as cellular LTE communications.

The wireless interface adapter 120, also known as a wireless interface device, may also include antenna systems 132 which may include any number of tunable antenna systems for use with the system and methods disclosed herein. Additional antenna system modification circuitry (not shown) may also be included with the wireless interface adapter 120 to implement coexistence control measures via an antenna controller 134 as described in various embodiments of the present disclosure.

In some aspects of the present disclosure, the wireless interface adapter 120 may operate two or more wireless links. In a further aspect, the wireless interface adapter 120 may operate the two or more wireless links with a single, shared communication frequency band such as with the Wi-Fi, Wi-Fi 6, or Wi-Fi 6E standards and the 4G and 5G standards relating to unlicensed wireless spectrum for small cell 4G and small cell 5G operation in an example aspect. For example, 2.4 GHz/2.5 GHz, 5 GHz, or 6-7 GHz wireless communication frequency bands may be apportioned under Wi-Fi, Wi-Fi 6, or Wi-Fi 6E protocols for Wi-Fi WLAN operation as well as utilized variously by the 4G or 5G standards for communication on either small cell WWAN wireless link operation. In some embodiments, the shared, wireless communication band may be transmitted through one or a plurality of antennas or antennas may be capable of operating at a variety of frequency bands.

The wireless interface adapter 120 may operate in accordance with any wireless data communication standards. To communicate with a wireless local area network (WLAN), standards including IEEE 802.11 a/h/j/n/ac/ax WLAN standards (e.g., IEEE 802.11ax-2021 (Wi-Fi 6E, 6 GHz)), IEEE 802.15 WPAN standards may be used and with WWAN such as 3GPP or 3GPP2, or similar wireless standards may be used. Wireless interface adapter 120 may connect to any combination of macro-cellular wireless connections including 2G, 2.5G, 3G, 4G, 5G, upcoming 6G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the 2.4/2.5 GHz frequency bands, −5 GHz frequency bands, or 6 or above GHz frequency bands.

WLAN, for example, may operate at a 2.4 GHz band, 5 GHz band, and/or a 6-7 GHz band according to, for example, Wi-Fi, Wi-Fi 6, or Wi-Fi 6E standards. Each of these frequencies used to communicate over the network 144 may be based on the radio access network (RAN) standards that implement, for example, AP hardware of one or more APs connected in wireless networks used to communicate with the information handling system 100. Information handling system 100 may be user information handling system having a plurality of WLAN antennas available for communication and those antennas may be tunable to select channels in the above frequency bands in some embodiments and to utilize particular Wi-Fi or Wi-Fi/Bluetooth® radio systems available at the information handling system. The plurality of WLAN antennas available for communication may further be tunable by an antenna controller 134 to make tuning adjustments for antenna efficiency among some of the 2.4 GHz band, 5 GHz band, or a 6-7 GHz band supported for communications with those antennas in example embodiments to optimize the available antennas and coordinate with received data from a selected AP or for plural APs and channels for wireless links to that AP or plural APs.

WWAN may operate in a number of bands, some of which are proprietary but may include a wireless communication frequency band. WWAN, for example, may operate in a low-band (e.g., 600-850 MHz), mid-band (e.g., 1.8-6 GHz), high-band (such as above 6 GHz, e.g., 25-60 GHz or even higher). In examples, WWAN carrier licensed bands for 5G may operate at the new radio frequency range 1 (NRFR1), NFRF2, bands, and other known bands. Each of these frequencies used to communicate over the network 144 may be based on the radio access network (RAN) standards that implement, for example, eNodeB or gNodeB hardware connected to wireless networks used to communicate with the information handling system 100. In the example embodiment, mobile device 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end of the information handling system 100 may operate on a licensed WWAN wireless radio with authorization for subscriber access to a wireless service provider on a carrier licensed frequency band.

The wireless interface adapter 120 can represent an add-in card, wireless network interface module that is integrated with a main board of the information handling system or integrated with another wireless network interface capability, or any combination thereof. In an embodiment the wireless interface adapter 120 may include one or more radio subsystems 130 including transmitters and interfacing with wireless controllers such as 132 for connecting via a multitude of wireless links. In an example embodiment, an information handling system may have plural antenna system transmitters for plural Wi-Fi WLAN radio subsystems 130 and antenna systems 132. Additionally, radio subsystems 130 and antenna systems 132 may be available on the information handling system for 5G small cell WWAN, BT, WiGig connectivity, and one or more additional antenna system transmitters for macro-cellular communication. As a result, available space on space-limited information handling systems is precious and integrating placement of those antennas may provide greater instances of interface with a user triggering specific absorption rate (SAR) adjustments to power or blockage of antennas detuning them for a frequency band or requiring adjustment to another antenna. The radio subsystems 130 include wireless controllers to manage authentication, connectivity, communications, power levels for transmission, SAR adjustments, buffering, error correction, baseband processing, channel selection, tuning and other functions of the wireless interface adapter 120.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device or other input/output devices 112, and other components that may require power when a power button has been actuated by a user. In an embodiment, the PMU 118 may monitor power levels and be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

Information handling system 100 includes one or more of an operating system (OS) 138, and basic input/output system (BIOS) firmware/software 136 or application programs that may be executable instructions 124 executed at any processor 102 and stored at one or more memory devices 104, 106, or 116. BIOS firmware/software 136 functions to initialize information handling system 100 on power up, to launch an OS 138, and to manage input and output interactions between the OS 138 and the other elements of information handling system 100. In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of information handling system 100. For example, application programs and BIOS firmware/software 136 can reside in drive 116, in a ROM (not illustrated) associated with information handling system 100, in an option-ROM (not illustrated) associated with various devices of information handling system 100, in a storage system (not illustrated) associated with network channel of a wireless interface adapter 120, in another storage medium of information handling system 100, or a combination thereof. Executable code instructions 124 for application programs and BIOS firmware/software 136 can each be implemented as single programs, or as separate programs carrying out the various features as described herein.

As shown in FIG. 1, the information handling system 100 may further include WLAN QoS and antenna tuning management module 140, a local system management software, or a WLAN discovery and connection agent software 139 according to embodiments herein within, or part of, the instructions 124. As described in greater detail below, the local system management software, or a WLAN discovery and connection agent software 139 according to embodiments herein may be used to parse access point telemetry and provide it to the WLAN QoS and antenna tuning management module 140 for input into determination of WLAN radio systems to use to select among APs, WLAN channels to use with a WLAN AP, or tuning of WLAN antennas to accommodate current telemetry conditions of the user information handling system in coordination with AP telemetry received from one or more APs. Such telemetry data may include local link quality metrics, orientation data, proximity data and AP telemetry may include AP channel utilization levels, congestion levels, dynamic bandwidth selections, Wi-Fi noise levels and the like and these may trigger AP selection, channel selection, or antenna tuning at the user information handling system when a wireless link quality degradation is detected.

In an embodiment, the information handling system 100 may connect to an external wireless network 144. In particular, the wireless network 144 may have a wireless mesh architecture in accordance with mesh networks described by the wireless data communications standards or similar standards in some embodiments but not necessarily in all embodiments. The wireless interface adapter 120 may connect to the external wireless network 144 via a WPAN, WLAN, WWAN or similar wireless switched Ethernet connection in some embodiments. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware information handling systems can be constructed to implement one or more of the methods described herein. Applications that may include the apparatus and systems of various embodiments can broadly include a variety of electronic and computer systems. One or more embodiments described herein may implement functions using two or more specific interconnected hardware modules or information handling systems with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the wireless network 144. Further, the instructions 124 may be transmitted or received over the wireless network 144 via the network interface device, i.e., the wireless interface adapter 120.

The wireless interface adapter 120 represents a network interface card (NIC) disposed within information handling system 100, on a main circuit board of the information handling system, integrated onto another component such as processor 102, in another suitable location, or a combination thereof. The wireless interface adapter 120 can include another information handling system, a data storage system, another network, a grid management system, another suitable resource, or a combination thereof. In an embodiment, the wireless interface adapter 120 may operably connect to the network 144. The connection to network 144 may be wired or wireless.

The network interface device shown as wireless interface adapter 120 can provide connectivity to the network 144, such as a wide area network (WAN), a local area network (LAN), wireless local area network (WLAN), a wireless personal area network (WPAN), a wireless wide area network (WWAN), or another network. Connectivity may be via wired or wireless connection. The wireless interface adapter 120 may include an adaptive massive MIMO Multiplexer with transmitter/receiver circuitry, wireless controller circuitry, amplifiers and other circuitry for wireless communications. The wireless interface adapter 120 may also include antenna systems 132 as described above which may be tunable antenna systems for use with the system and methods disclosed in the embodiments herein. The antenna controller 134 may also include wireless controllers to manage authentication, connectivity, communications, power levels for transmission, buffering, error correction, baseband processing, and other functions of the wireless interface adapter 120.

The information handling system 100 can include a set of instructions 124 that can be executed to cause the computer system to perform any one or more of the methods or computer-based functions disclosed herein. For example, instructions 124 may execute a WLAN QoS and antenna tuning management module 140, a local system management software, or a WLAN discovery and connection agent software 139, various software applications, software agents, or other aspects or components according to embodiments herein. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 and antenna controller 134 to perform the processes described herein. Similarly, main memory 104 and static memory 106 may also contain a computer-readable medium for storage of one or more sets of instructions, parameters, or profiles 124 including one or more look-up tables and/or one or more antenna selection algorithms 164. The disk drive unit 116 or static memory 106 also contain space for data storage. Further, the instructions 124 may embody one or more of the methods or logic as described herein. In a particular embodiment, the instructions, parameters, and profiles 124 may reside completely, or at least partially, within the main memory 104, the static memory 106, and/or within the disk drive 116 during execution by the processor 102 or an antenna controller 134 of information handling system 100. The main memory 104 and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The antenna selection algorithm 164 and sideband serial messaging protocol 142 and the drive unit 116 may include access to a computer-readable medium 122 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such devices, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
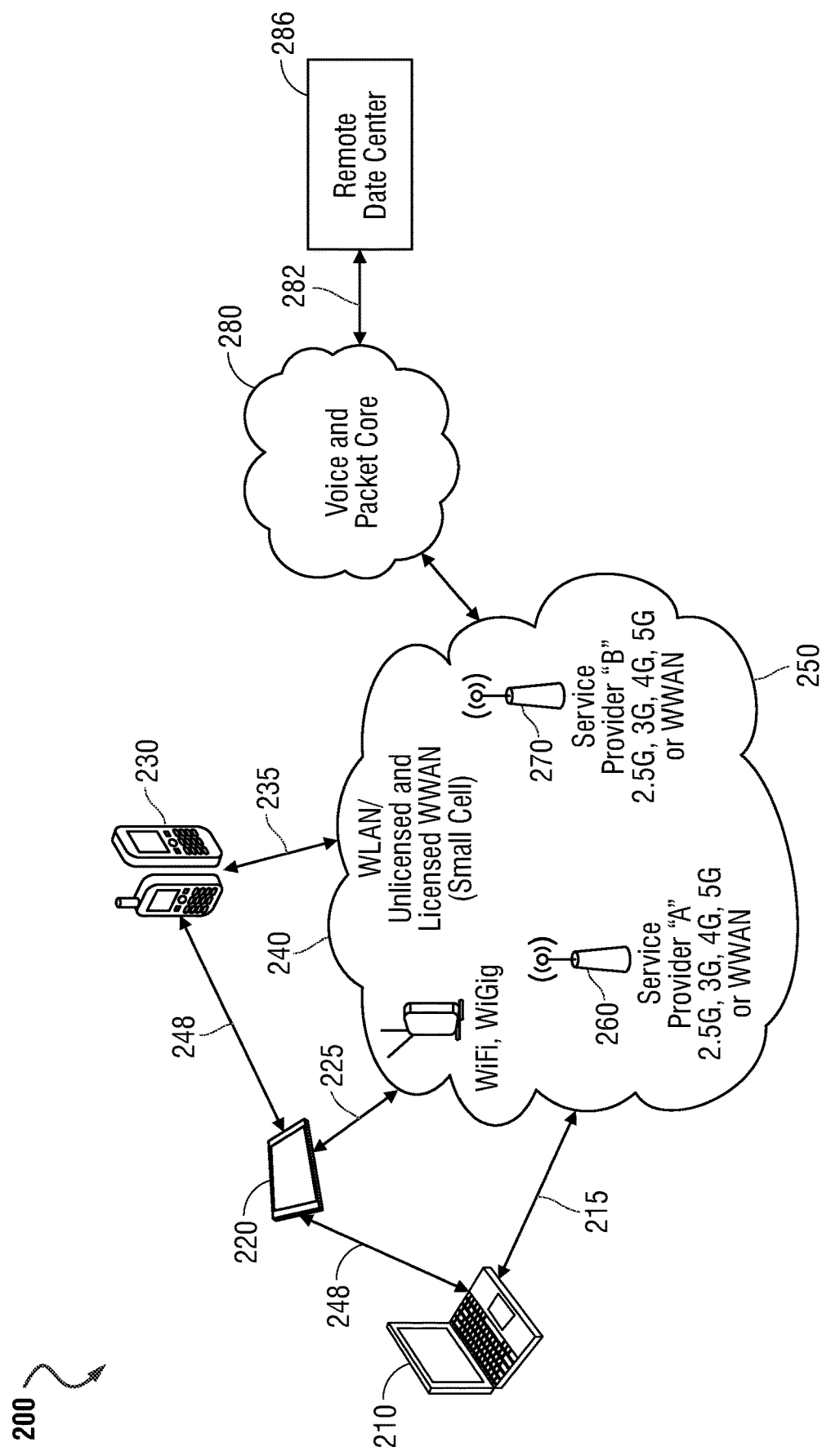
FIG. 2 is a block diagram of a network environment offering several communication protocol options and mobile information handling systems according to an embodiment of the present disclosure.

FIG. 2 illustrates a network 200 that can include one or more information handling systems 210, 220, 230. The information handling systems 210, 220, 230 shown in FIG. 2 may be similar to the information handling system 100 described in connection with FIG. 1. In a particular embodiment, network 200 includes networked mobile devices 210, 220, and 230, wireless network access points, and multiple wireless connection link options. A variety of additional computing resources of network 200 may include client mobile devices, data processing servers, network storage devices, local and wide area networks, or other resources as needed or desired. As partially depicted, information handling systems 210, 220, 230 may be a laptop computer, tablet computer, 360-degree convertible systems, wearable computing devices, or a smart phone device. These mobile devices 210, 220, and 230, may access a wireless local network 240, or they may access a macro-cellular network 250. For example, the wireless local network 240 may be available through an access point 245 and may operate a wireless local area network (WLAN), a wireless personal area network (WPAN), or a wireless wide area network (WWAN). The access point 245 may be a WLAN access point for Wi-Fi communications in an embodiment. In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points 245 or base stations 260, 270 may be connected to a wireless network controller and an Ethernet switch. Wireless communications across wireless local network 240 may be via standard protocols such as IEEE 802.11 Wi-Fi, IEEE 802.11ad IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service provider base stations 260 and 270. As described herein, a plurality of antennas may be operatively coupled to any of the macro-cellular connections 250 via one or more service providers or to the wireless local area networks (WLANs) selectively based on the SAR data, RSSI data, configuration data, system operation and connection metrics, and antenna mounting locations (e.g., spatial locations within the information handling system) associated with each information handling systems 210, 220, 230 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. Each of these frequencies used to communicate over the network may be based on the radio access network (RAN) standards that implement, for example, eNodeB or gNodeB hardware connected to mobile phone networks (e.g., cellular networks) used to communicate with the information handling system 210, 220, or 230. In the example embodiment, mobile devices 210, 220, or 230 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling system 210, 220, or 230 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile devices 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling system 210, 220, 230 may be used on each of the wireless communication devices such as according to embodiments herein and may be suited to plural RF bands. Within local portion of wireless network 250 access points for Wi-Fi or WiGig as well as small cell WWAN connectivity may be available in emerging 5G technology. This may create situations where a plurality of antenna systems are operating on a mobile device 210, 220 or 230 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein.

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile devices such as 210, 220, 230 or similar connected to those additional wireless networks. Connection 282 between the wireless network 240 and remote data center 286 or connection to other additional wireless networks may be via Ethernet or another similar connection to the worldwide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile device or may connect directly to one or more mobile devices 210, 220, and 230. Alternatively, mobile devices 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile devices 210, 220, and 230 allowing streamlining and efficiency within those devices. Similarly, remote data center permits fewer resources to be maintained in other parts of network 200.

In a particular aspect, the remote data center 286 may include an authentication server. The authentication server may authenticate information handling systems, e.g., a trusted and authenticated information handling system, based on local credentials that may be stored at the trusted and authenticated information handling system and transmitted to the remote data center 286. The remote data center 286 may also include a SIM profile provisioning server. The SIM profile provisioning server may be used to distribute SIM profiles, e.g., eSIMS, to new information handling systems as these new information handling system are brought online for the first time.

Although 215, 225, and 235 are shown connecting wireless adapters of mobile devices 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile devices 210, 220, and 230 may communicate intra-device via 248 when one or more of the mobile devices 210, 220, and 230 are set to act as an access point or even potentially an WWAN connection via small cell communication on licensed or unlicensed WWAN connections. For example, one of mobile devices 210, 220, and 230 may serve as a Wi-Fi hotspot in an embodiment. Concurrent wireless links to information handling systems 210, 220, and 230 may be connected via any access points including other mobile devices as illustrated in FIG. 2.

Figure 3:
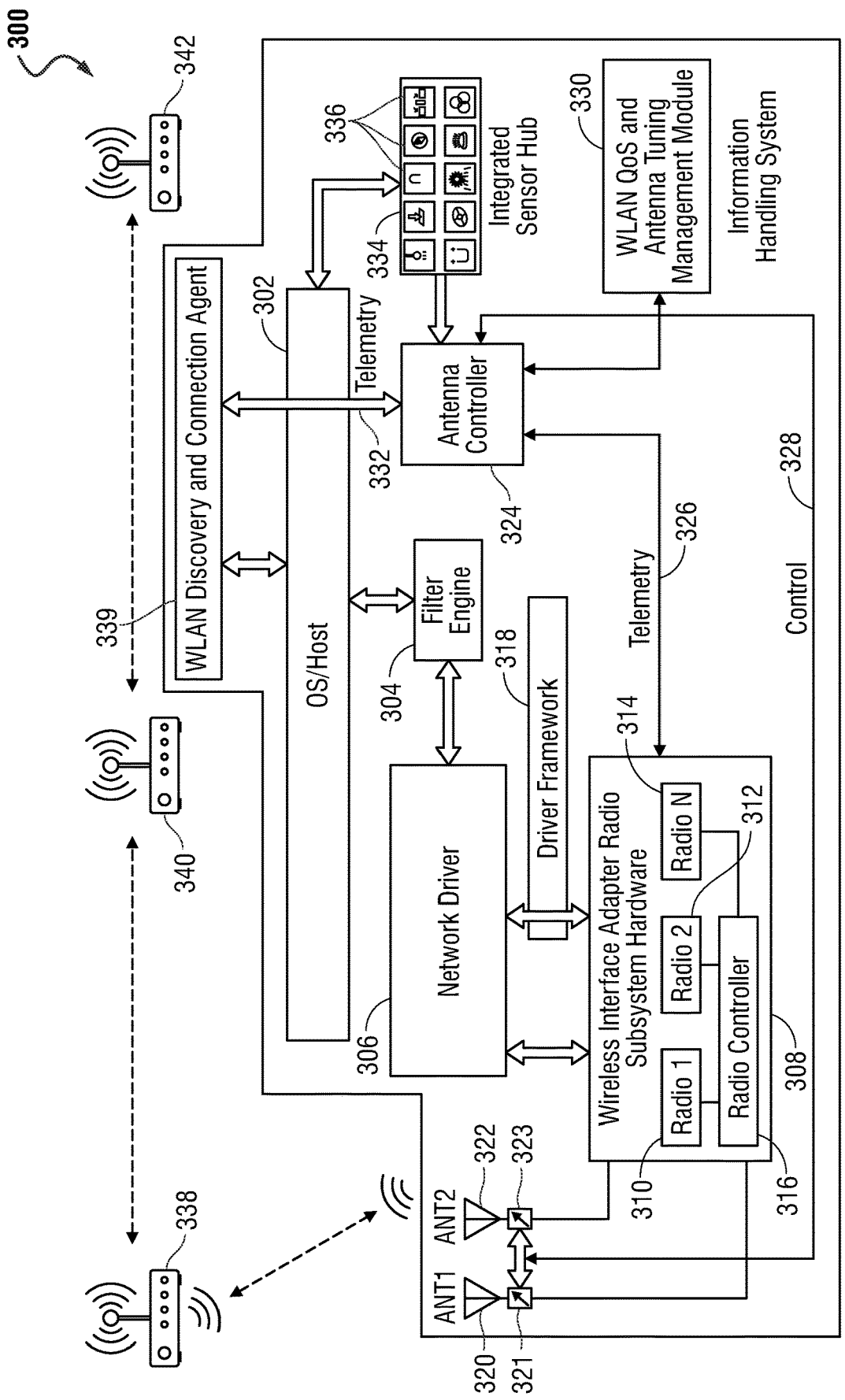
FIG. 3 is a block diagram of an information handling system according to another embodiment of the present disclosure.

Referring now to FIG. 3, another information handling system, according to an embodiment, is illustrated and is generally designated 300. The information handling system 300 may include one or more of the same elements as the information handling system 100 illustrated in FIG. 1. As illustrated, in this particular embodiment, the information handling system 300 may include an operating system (OS)/host 302. As is known in the art, the OS/host 302 may be system software that may manage computer hardware, software resources. The OS/host 302 may also provide common services for computer programs operating within the information handling system 300. The OS/host 302 may work to execute one or more software applications as described herein. The OS/host 302 may in part execute portions of applications for a WLAN QoS and antenna tuning management module 330 according to an embodiment herein or may operate a local system management software such as Dell Optimizer® to collect, monitor and analyze various system telemetry for interface with WLAN QoS and antenna tuning management module 330. The WLAN QoS and antenna tuning management module 330 may execute in whole or in part in an antenna controller system 324 in some embodiments. Antenna controller 324 is capable of receiving a plurality of telemetry inputs in an example embodiment for management and control of the antenna systems of a user information handling system 300. Further, the OS 302 may support or execute some portion of WLAN QoS and antenna tuning management module 330.

Additionally, as part of interfacing with one or more APs 338, 340, 342 within radiofrequency range of user information handling system 300, a WLAN discovery and connection agent software 339 may operate, for example to receive standard WLAN beacons such as OCE-MBO IE frames indicating RF band and channel status and data as well as more frequent FILS beacons advertising available WLAN APs under one or more IEEE 802.11 wireless protocol sections according to embodiments herein. In an embodiment, the OCE-MBO IE frames may be received through Wi-Fi wireless links and forwarded to the WLAN QoS and antenna tuning management module 330 in an embodiment. In a particular embodiment, the WLAN discovery and connection agent software 339 may be configured to receive and parse a modified FILS beacon or frame including AP telemetry data from a candidate AP and neighboring APs 338, 340, and 342. The WLAN discovery and connection agent software 339 may provide this AP delivered telemetry data to the antenna controller 324 and the WLAN QoS and antenna tuning management module 330 according to embodiments herein. Because the FILS beacon frames are delivered more frequently, up to four times faster, than previous WLAN beacons for passive AP scanning of WLAN APs in the current IEEE 802.11 next generation Wi-Fi standards, utilization of these FILS beacon frames is possible for quicker AP discovery. Due to the increase frequency, it is also possible to gain more current AP conditions for use with a closed-loop control system for managing channels, radio selection, and tuning of one or more WLAN antennas on a user information handling system. In an embodiment, the FILS beacon frames add additional bytes of data in a modified FILS beacon frame to deliver current AP and RAN conditions on channel utilization, congestion, Wi-Fi noise, dynamic bandwidth selection status, and other AP based RAN conditions for the AP and neighboring APs 338, 340, 342 from at least one AP to the user information handling system as AP telemetry. In one example embodiment, the FILS beacon frame may be modified to add 1-5 bytes. This AP telemetry may be shared among plural, neighboring APs 338, 340, and 342 and aggregated to be delivered by one AP 338 as shown according to an embodiment of FIG. 3. The WLAN discovery and connection agent software 339 may operate to receive this passive AP scanning information and parse the modified FILS beacon to provide the current iteration of AP telemetry data to the antenna controller 324 and WLAN QoS and antenna tuning management module 330.

As shown, in an embodiment, a filter engine 304 may be operatively coupled to, or operate within, the OS/host 302. In an embodiment, the filter engine 304 may be used to shape inbound or outbound signals according to a higher-layer specification that may define which spectrum fragments to use for transmission or reception.

In an embodiment, a network driver 306 may be operatively coupled to the filter engine 304. FIG. 3 also shows that wireless adapter radio subsystem hardware 308 may be operatively coupled to the network driver 306. In an embodiment, the network driver 306 may act as an interface between the OS and the wireless adapter radio subsystem hardware 308. The network driver 306 may also act as a network controller. The wireless adapter radio subsystem hardware 308 may include a first radio 310, a second radio 312, and an Nth radio 314. The wireless adapter radio subsystem hardware 308 may also include a radio controller 316 operatively coupled to the radios 310, 312, 314. In an embodiment, the radios 310, 312, 314 include one or more of a Wi-Fi radio, a Bluetooth radio, or a combination thereof. As illustrated, a driver framework 318 may reside between the network driver 306 and the wireless adapter radio subsystem hardware 308. The driver framework 318 may include one or more tools and libraries that may assist in the creation of one or more device drivers for the information handling system 300. FIG. 3 also shows that a first antenna 320 and a second antenna 322 may be operatively coupled to the wireless adapter radio subsystem hardware 308. It is to be understand that the information handling system 300 may include more antennas than the first antenna 320 and the second antenna 322 as shown.

Still referring to FIG. 3, an antenna controller 324 may be operatively coupled to the wireless adapter radio subsystem hardware 308 and the antennas 320, 322 and tuning controls 321 and 323. In one embodiment, tuning controls 321 and 323 may include variable resistor, inductor, capacitor (RLC) matching circuitry that may adjust matching of an antenna feed with the antenna elements of 320, 322 in one embodiment to adjust the tuned radiofrequency band efficiency loss profile of any of the plural antennas 320 or 322. Adjustment to a variable component (e.g., a variable resistor or variable conductor component) of the RLC matching circuitry of antenna tuning controls 321 and 323 may be used in one embodiment to adjust the optimal radiofrequency loss profile to minimize loss for a desired radiofrequency band. In another embodiment, parasitic elements may be part of the antenna tuning controls 321 and 323 for antennas 320, 322 and may be actuated as part of radiofrequency signal transmission or reception to change the optimal radiofrequency loss profile to minimize loss for a particular radiofrequency band of any of the plurality of antennas 320, 322. Additionally, directionality of antenna transmission or reception may be similarly controlled. In a particular example embodiment, one or more of the plurality of antennas 320, 322 may be capable of transmission or reception in a plurality of bands, however adjustment may be necessary to utilize the antenna 320 or 322 to accommodate an optimal loss profile for a band in use at that antenna. For example, an antenna may transmit/receive at a 2.4 GHz band as well as at 5 GHz band or 6 GHz band, but controlled tuning is necessary to optimize between when the 5 GHz band or 6 GHz band to reduce signal reflection due to mismatch depending on the tuning. The RLC matching circuit control of antenna tuning controls 321 and 323 may be actively adjusted depending upon whether an antenna controller 324 and WLAN QoS and antenna tuning management module 330 indicates which of a 5 GHz or 6 GHz band will be used and indicates selection of the same to a corresponding radio 310, 312, 314 in one example embodiment. In another example embodiment, adjustment to actuation of parasitic elements, such as via switching, for antenna tuning controls 321 and 323 may similarly be made as tuning control for either the 5 GHz or 6 GHz band in another embodiment. Further, the antenna controller 324 may further utilize the WLAN discovery and connection agent 339 to communicate a change between bands and protocols to the AP 338 and neighboring APs 340 and 342 to activate pairing and connection to the AP corresponding to the 5 GHz or 6 GHz band to be used under the WLAN protocol with the user information handling system.

In an embodiment, the antenna controller 324 may exchange telemetry 326 with the wireless adapter radio subsystem hardware 308 as well as other telemetry inputs. Further, the antenna controller 324 may transmit one or more control signals 328 to the antennas 320, 322 and antenna tuning controls 321 and 323. As indicated, in an embodiment, a WLAN QoS and antenna tuning management module 330 may be executed, in whole or in part, by the antenna controller 324. In other embodiments, some portion of the WLAN QoS and antenna tuning management module 330 may be executed at another controller such as an embedded controller, radio controller, or at another processor such as a CPU. The WLAN QoS and antenna tuning management module 330 and antenna controller 324 may exchange telemetry 332 with the WLAN discovery and connection agent 339 which may be a source of received AP telemetry data for AP 338 and gathered telemetry from neighboring APs 340 and 342. That telemetry may include access point telemetry information such as channel utilization, Wi-Fi noise, dynamic bandwidth selection, AP or network congestion, average latencies, or other AP telemetry data including indication of available bands and channels at AP 338 and neighboring APs 340 and 342. As described herein, the WLAN discovery and connection agent 339 may receive regular, current AP telemetry data on FILS beacon frames received and parsed there and provided to the WLAN QoS and antenna tuning management module 330 along with AP telemetry data received via the MBE-OBE IE frames under the Wi-Fi standards.

FIG. 3 also illustrates an integrated sensor hub 334 that may be operatively coupled to the antenna controller 324 and to the OS 302. The integrated sensor hub 334 may include one or more sensors 336. For example, the one or more sensors 330 may include one or more proximity sensors (P-sensors), one or more gyroscope sensors, one or more orientation sensors, one or more hall effect sensors, one or more accelerometers, one or more temperature sensors, one or more pressure sensors, one or more ambient light sensors, one or more magnetometers, one or more UV light sensors, one or more magnetic inductive sensors, one or more IR sensors, or a combination thereof. The integrated sensor hub 334, and one or more of the sensors therein, may be used to determine which antenna 320, 322 is best suited for connection to a particular wireless network in light of antenna blockage by a user's body part with proximity sensing or based on detected orientation. Such determination of an antenna or selected antenna directionality adjustments where applicable may be dependent on the orientation of the information handling system 300, the placement of the user's hands relative to the information handling system 300, or similar factors determined from the integrated sensor hub 334 telemetry data.

FIG. 3 further shows that the information handling system 300 may be operatively coupled to a first access point 338, a second access point 340, or an Nth access point 342. In a particular embodiment, any of the access points 338, 340, 342 may be used to operatively couple the information handling system 100 to a network. In an embodiment, one access point, shown as 338, may be operatively coupled to the user information handling system 300 to receive FILS beacon frames modified with AP telemetry from AP 338 and from neighboring APs such as 340 and 342. The network may include wireless access points 338, 340, 342 that operate on a variety of radiofrequency bands as described and support next generation Wi-Fi operation. In an embodiment, during operation of the user information handling system 300, described in greater detail below, the WLAN QoS and antenna tuning management module 330 at the antenna controller 324 may utilize information from the WLAN discovery and connection agent 339 with AP telemetry information from the access points 338, 340, 342 parsed from FILS beacon frames or received from MBE-OCE IE frames, information from the network driver 306, telemetry information from the radio controller 316 and radios 310, 312, and 314, and telemetry information from the integrated sensor hub 334 (and the sensors 336 therein) to tune the antennas 320, 322 with antenna tuning controls 321, 323 as well as select changes in channels or changes in radios used to communicate with selected APs 338, 340, 342 based on antenna user blockage or power reduction due to proximity, low channel utilization or congestion, avoidance of latency and retries needed to communicate with an AP and other factors determined from the telemetry information received via look up tables for selection of antennas, radiofrequency bands, channels and radios to be used. Such a system also enables design of fewer antennas 320, 322 to be used with user information handling system since active tuning of existing, multi-band antennas for optimized operation may be used rather than dedicated passive antennas optimized for each potential radiofrequency band to be used with WLAN protocols. This provides for precious space savings in already limited mobile information handling system designs, particularly those with all metal or mostly metal designs limiting available locations for antenna placement and designs.

Figure 4:
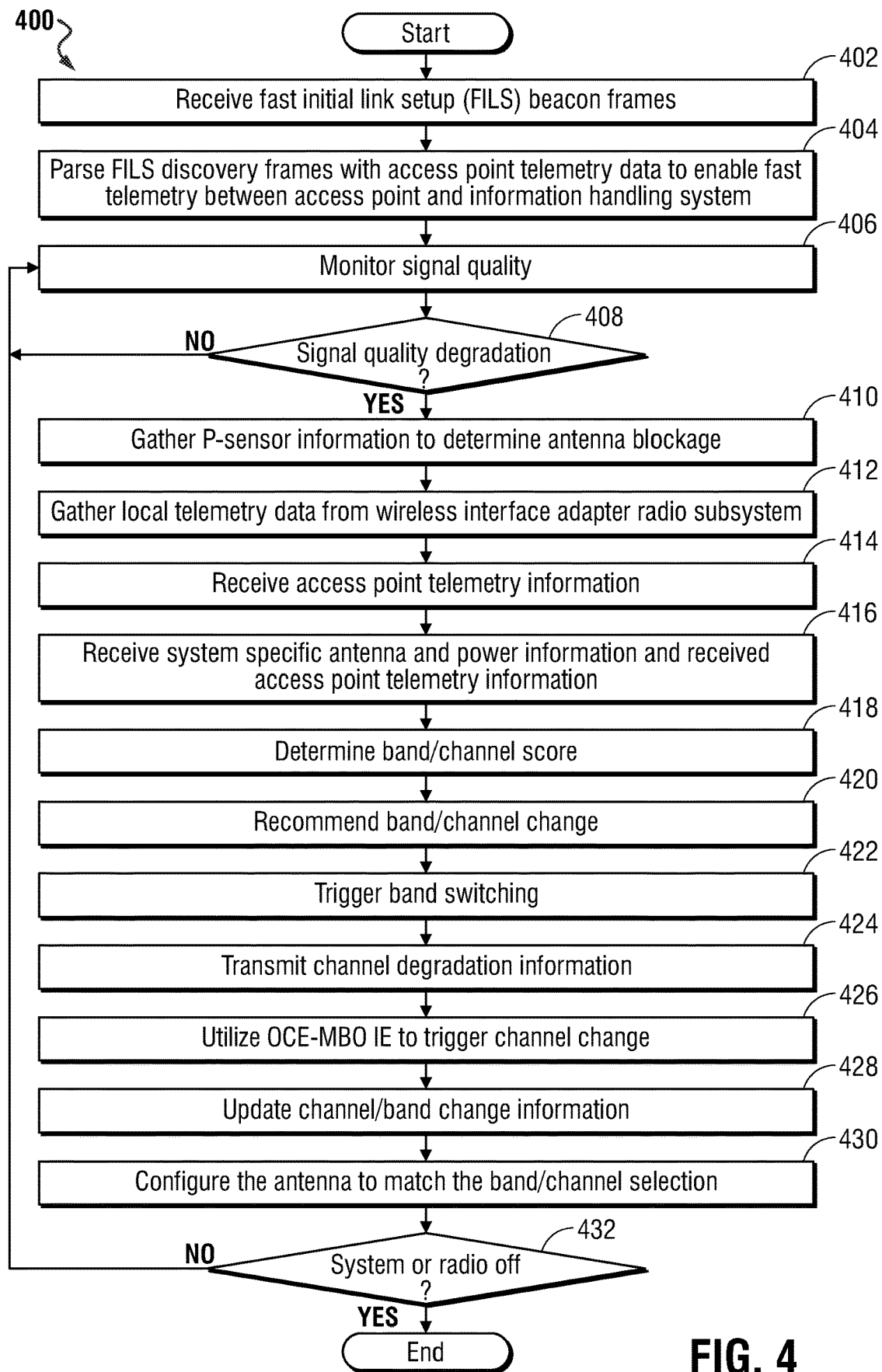
FIG. 4 is a flow diagram illustrating a method of tuning antennas within an information handling system according to an embodiment of the present disclosure.

Referring now to FIG. 4 a flow diagram illustrating a method of tuning antennas within an information handling system according to an embodiment of the present disclosure is shown and is generally designated 400. Commencing at block 402, the method 400 may perform fast initial link setup (FILS) operation of a WLAN discover a connection agent to receive FILS beacon frames for passive discovery of APs within range of the user information handling system. In an embodiment, a FILS authorization may be performed between the radio controller 316 within the information handling system 300 and the current access point and between the antenna controller 324 within the information handling system 300 and the current access point.

Further, the FILS discovery beacon frames or mini-beacons are received at four times the beacon interval of other WLAN frames such as MBE-OCE IE frames indicating AP telemetry for radiofrequency band and channel information for APs. This FILS beacon frame rate enables fast telemetry between the current access point as well as neighboring access points, and the information handling system 300 to help with active antenna tuning and radiofrequency band and channel selection for WLAN radios to substantially reduce the duration of periods of low-quality signal and utilize multi-band capable antennas with this active, closed-loop tuning as described further below.

As such, at block 404, the method 400 utilized any WLAN MBE-OCE IE frame AP telemetry data as well as FILS discovery beacon frames enabled for AP telemetry. The FILS discovery beacon frames or mini beacons as modified to include the AP telemetry data to enable fast telemetry between the current access point, neighboring APs and the information handling system 300. The WLAN discovery and connection agent 339, such as Dell® Express Connect, operating on the user information handling system may receive the FILS discovery beacon frames and parse them for appended fast AP telemetry data for a current AP and neighboring APs. Such data may be provided to the antenna controller 324 and WLAN QoS and antenna tuning management module 330 to provide for antenna tuning management, channel or band selection, and radio selection according to embodiments herein.

Moving to block 406, the WLAN QoS and antenna tuning management module 330 may monitor the signal quality between the current access point and the information handling system 300 based on received fast AP telemetry data, telemetry data from the wireless adapter radio subsystem 308 or other sources such as the integrated sensor hub 334.

In one embodiment, Wi-Fi noise levels, channel utilization or congestion may be provided from fast AP telemetry data indicating a signal quality degradation issue utilizing the current AP. In other embodiments, telemetry from the wireless adapter radio subsystem 308 may indicate levels of RSSI, bit error rate, signal to noise ratio, or a combination thereof or other local QoS metrics that have reached or surpassed a threshold levels indicating signal quality degradation. In a particular embodiment, the signal quality may be monitored using a P-sensor or orientation sensors within the integrated sensor hub 334 of the information handling system 300. For example, the P-sensor may detect that a user's hand has moved into place near or over an antenna and that placement of the user's hand may cause signal degradation due to antenna blockage or power reduction for SAR reasons. Orientation change of the user information handling system 300 may also be detected and a new orientation may have documented effects on signal quality from one or more antennas.

At decision 408, the method 400 may determine if signal quality degradation is occurring. In an embodiment, the signal quality degradation may be detected by WLAN QoS and antenna tuning management module of the antenna controller the information handling system 300. For example, in an embodiment, signal quality degradation may occur when the signal strength falls below a predetermined level or when the signal to noise ratio falls below a predetermined level based on local wireless adapter telemetry, received AP telemetry, anticipated level changes based on integrated sensor hub telemetry or the like. At decision 408, if signal quality degradation is not occurring, the method 400 may return to block 406 and the method 400 may continue to monitor signal quality as described above.

Conversely, at decision 408, if signal quality degradation is occurring, the method 400 may proceed to block 410. At block 410, the method may gather P-sensor information or other orientation sensor information. For example, the antenna controller 324 may gather the P-sensor information or orientation sensor information from the radio controller 316 of the information handling system 300. In an embodiment, the P-sensor information may include indication of antenna blockage. Orientation sensor information may indicate a change in orientation and the new orientation detected. Such data may be provided by the integrated sensor hub to the WLAN QoS and antenna tuning management module at the antenna controller. The WLAN QoS and antenna tuning management module at the antenna controller may process the P-sensor information or orientation information to determine the antenna that is experiencing blockage or signal degradation due to these changes.

At block 412, the method 400, local telemetry data may be received indicating the current the signal strength, signal to noise ratio or other QoS metrics from the wireless adapter radio subsystem. The wireless adapter radio subsystem may include telemetry data on which active antennas are being used, radiofrequency bands and channels operating, power levels as well as local QoS metrics. Such data may be provided by the integrated sensor hub to the WLAN QoS and antenna tuning management module at the antenna controller.

Further, at block 414, the method 400 may receive access point telemetry information. For example, the access point telemetry information may be received at the antenna controller 324 and the WLAN QoS and antenna tuning management module 330 within the information handling system 300 from the WLAN discovery and connection agent 339. In one embodiment, the antenna controller 324 and the WLAN QoS and antenna tuning management module 330 may receive WLAN MBE-OCE IE frames via the Wi-Fi channel and those may be forwarded to the antenna controller indicating wireless band and channel information of the AP or neighboring APs. Further, fast AP telemetry data may be received with modified FILS discovery beacon frames and include the AP telemetry information such as channel utilization, Wi-Fi noise, dynamic bandwidth selection, congestion, latency or retry data, other AP telemetry data, or a combination thereof. Such fast AP telemetry data may be received and be current via the FILS discovery beacon frames at the WLAN discovery and connection agent 339. Such data may be parsed there, and fast AP telemetry data provided to the WLAN QoS and antenna tuning management module 330.

At block 416, the method 400 may commence determining a new band/channel by receiving system specific antenna and power level information, local telemetry, and received AP telemetry. For example, the antenna controller 324 within the information handling system 300 may proceed to determine the new band/channel based on received system specific antenna and power information, local telemetry including wireless adapter radio subsystem telemetry and integrated sensor hub telemetry, as well as AP telemetry data received via the FILS discovery beacon frames and OCE-MBO IE frames indicating AP status and neighbor AP status and availability. WLAN QoS and antenna tuning management module 330 may, upon determining that a current radiofrequency band or channel is experiencing sufficient signal quality degradation to trigger assessment for a new band/channel for the information handling system to find a clean radiofrequency band and channel from the available APs within range of the user information handling system.

At block 418, the method 400 may determine band/channel score. In a particular embodiment, the WLAN QoS and antenna tuning management module 330 within the information handling system 300 may determine the band/channel score. For example, the WLAN QoS and antenna tuning management module 330 may score or compare other available channels or bands available to access the current AP as well as other available channels or bands available on neighboring APs based on fast AP telemetry data received at the user information handling system. Neighboring fast AP telemetry data may be gathered by the current AP and provided in modified FILS discovery beacon frames or may be independently provided to a user information handling system from the neighboring APs with their own modified FILS discovery beacon frames or some combination in various embodiments. The modified FILS discovery beacon frames may include AP telemetry data in the optional bacon payload. For example, under the next generation Wi-Fi standard, The FILS discovery beacon frames may include AP telemetry for the currently connected AP in FD capability and access network options (ANO) fields within optional payload of the FILS discovery beacon frames. Further, the optional beacon data payload may also include neighbor AP information including neighbor AP telemetry information gathered by the currently-connected AP for transmission of the AP telemetry report to the user information handling system. As described, the FILS discovery beacon frames have limited payload available but are provided with greater frequency than other WLAN frames. Thus, AP telemetry received in such a way may be more current and is referred to as fast AP telemetry information. The scoring of bands and channels available from a current AP and neighboring APs may be based upon fast AP telemetry information provided as channel utilization, Wi-Fi noise, dynamic bandwidth selection, congestion, latency or retry data, other AP telemetry data, or a combination thereof to determine which channels have a clean channel to assist in reduction of AP reaction time due to packet retries or switching latency because of high channel utilization, noise, latency, switching, or the like. The WLAN QoS and antenna tuning management module 330 may thus determine an uplink scoring metric from the fast AP telemetry data that may also include a score on range of an AP relative to a user information handling system which may be particularly pertinent to higher frequency radio frequency band selection.

At block 420, the method 400 may recommend a band/channel change. In an embodiment, the WLAN QoS and antenna tuning management module 330 of the antenna controller 324 within the information handling system 300 may recommend the band/channel change to within the information handling system 300. The WLAN QoS and antenna tuning management module 330 may thus determine if one or more AP and bands/channels with relatively good uplink scoring metric from the fast AP telemetry with channel occupancy ratings indicating available clean or vacant channels and AP range indications to match with available antennas, radios, and tuning configurations at the user information handling system based on local telemetry data from a wireless adapter radio subsystem as well as from an integrated sensor hub. For example, tuning configuration for an antenna with respect to matching for signal loss efficiency or reduce signal reflection, directionality to an AP range and location, or other tuning within the active antenna supported frequency band range with such tuning is determined. Further, directionality of an antenna is unique depending on orientation and may be critical for particular radiofrequency bands. For example, if blockage occurs as detected by a P-sensor or orientation change is detected impacting one antenna, selection of a different antenna in one example embodiment may be required and may impact the channels or bands available as well as necessary tuning for signal loss or reflection as well as directionality. Directionality of the antennas may be impacted by tuning via parasitic element usage of phase shifting and may be determined for an AP range or location having clean radiofrequency band and channel uplink score. Based on these factors as assessed utilizing one or more look up tables in an example embodiment, a recommended band and channel change selection may be made. Thus, the antenna controller 324 may also execute tuning adjustments as described further below.

Thereafter, at block 422, the method 400 may trigger band switching. For example, in an embodiment, the WLAN QoS and antenna tuning management module 330 within the information handling system 300 may trigger the band switching. At block 424, the method 400 may transmit channel degradation information. In an embodiment, the WLAN QoS and antenna tuning management module 330 within the information handling system 300 may transmit the channel degradation information to the current access point that is operatively coupled to the information handling system 300. Moving to block 426, the method 400 may utilize an optimized connectivity-multiband operation information element (OCE-MBO IE) to trigger a channel change at the current AP or selected neighboring AP. In an embodiment, the current access point connected to the information handling system 300 may use the OCE-MBO IE frame to trigger the channel change at the currently connected AP. If a channel change is to be conducted to a neighboring AP, the currently connected AP will send the channel or band change information received via the OCE-MBO IE frame to the neighbor AP to influence the channel/band change as corresponding to the determination made. Then, at block 428, the method 400 may update channel/band change information. For example, the current access point connected to the information handling system 300 may transmit the updated channel/band change information to the radio controller 316 within the information handling system 300.

At block 430, the method 400 may configure the antenna to match the band/channel selection. Specifically, antenna controller 324 within the information handling system 300 may transmit a signal to the wireless adapter radio subsystem 308 and the radio controller 316 within the information handling system 300 in order to configure the radio or radios used to transceive with the selected, new band, channel or AP in an embodiment. For example, signal to the wireless adapter radio subsystem 308 and radio controller 316 may trigger any selection of different radios, radiofrequency bands used by the radios, or channels to be transceived on for the wireless adapter radio subsystems to match the band/channel selection for a selected AP. Further, the antenna controller 324 may transmit a signal to the antenna tuning controls 321 and 323 at antennas 320 and 322 to adjust tuning for bands to provide reduced loss and improved operation at a selected radiofrequency band and channel by one or more of the plural antennas 320 and 322. Additionally, the antenna controller may transmit a signal to the antenna tuning controls 321 and 323 at antennas 320 and 322 to adjust any relevant directionality necessary for the selected radiofrequency band or channel of a particular AP within range. Thus, radiofrequency band and channel operation on the one or more antennas 320, 322 and directionality of the antennas 320, 322 may be tuned to utilize a selected band and channel on an AP determined to have a sufficient uplink score and matched to available antenna tuning configurations at the user information handling system. In this way, WLAN QoS and antenna tuning management module 330 may configure one or more antennas 320, 322 and radio systems at the user information handling system based on received telemetry including the received fast AP telemetry received from at least one access point operatively coupled to the information handling system 300.

The method 400 may proceed to block 432 where it is determined if the user information handling system or the radio systems thereon are powered off. If not, the method 400 may return to block 406 to monitor signal quality of the currently-linked AP and with the current radio subsystems and antenna configuration and tuning. Telemetry data may be received from the AP as well as local telemetry and the WLAN QoS and antenna tuning management module 330 may proceed as described to determine if a change in band or channel selection is required. If the system or radio systems do power down at block 432, then the method 400 may end.

Figure 5:
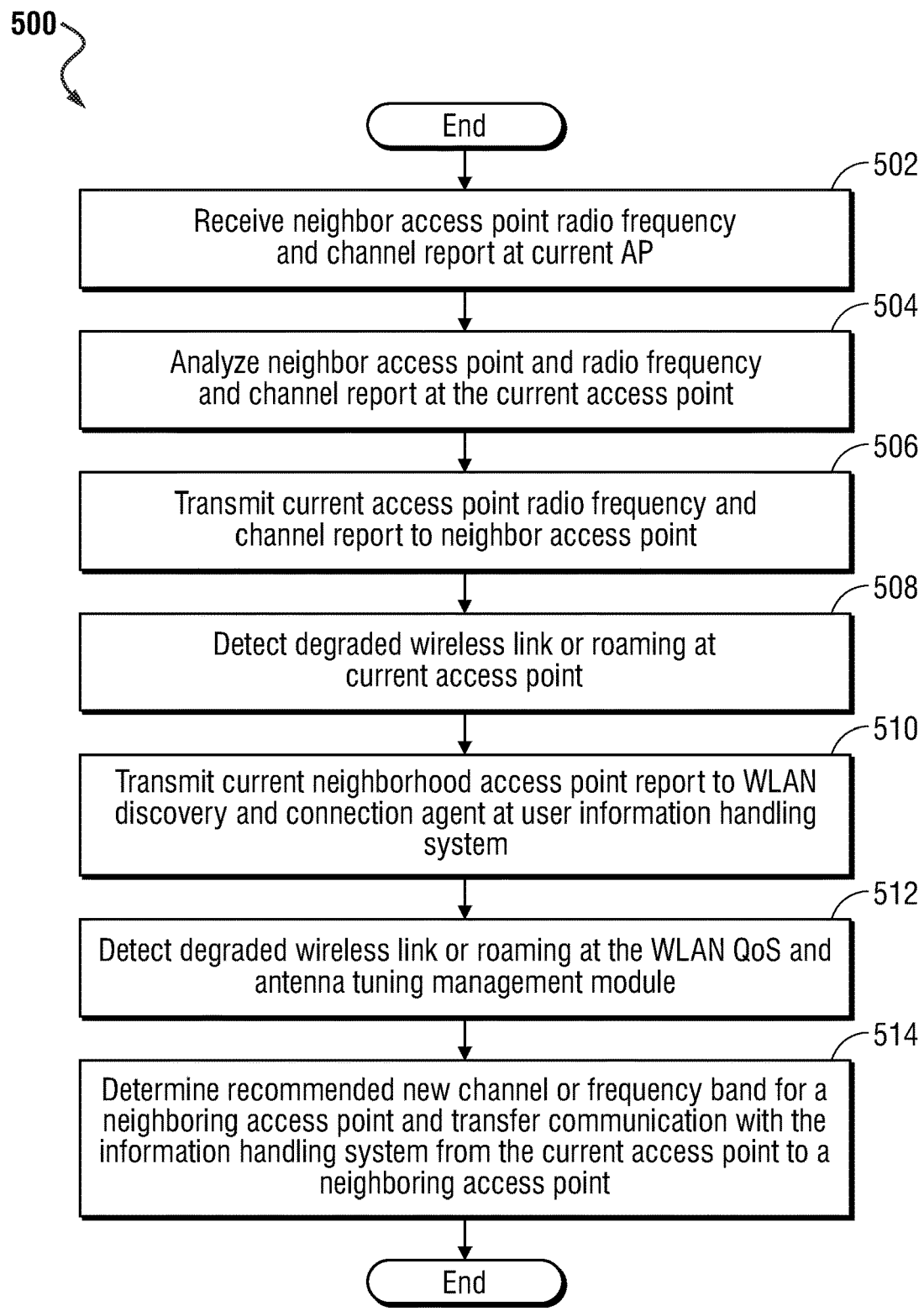
FIG. 5 is a flow diagram illustrating a method of communicating between access points operatively coupled to an information handling system according to another embodiment of the present disclosure.

FIG. 5 is a flow diagram illustrating a method, designated 500, of communicating between access points operatively coupled to an information handling system according to another embodiment of the present disclosure. This relates to an embodiment where one access point, such as a currently coupled access point to a user information handling system, collects radiofrequency band and channel information from neighboring APs. Beginning at block 502, the method 500 may receive a neighbor access point radio frequency band and channel report at a current access point. For example, the neighbor access point may transmit the radio frequency and channel report to the current access point for including via FILS discovery beacon frames which may be used as mini beacons to enable fast telemetry between the current access point a user information handling system. Such FILS discovery beacon frames may include fast AP telemetry data from one or more neighbor access points. At block 504, the method 500 may analyze neighbor access point radio frequency and channel report at the current access point and develop a neighborhood AP radiofrequency band and channel report that may form the fast AP telemetry data for transmission to the user information handling system via a modified FILS discovery beacon frame in an embodiment. In an embodiment, some portion of the AP radiofrequency band and channel report may be shared with a user information handling system via an OCE-MBO IE frame or other WLAN frame. Thereafter, at block 506, the method 500 may transmit the neighborhood access point radio frequency and channel report to at least one neighbor access point in one embodiment. For example, the current access point may transmit the current access point radio frequency and channel report from the current access point as well as any combined neighborhood radio frequency and channel report to neighbor access point for possible use at the neighbor AP for any fast AP telemetry reporting.

Proceeding to block 508, the method 500 may detect a degradation of wireless link signal performance or detect roaming of an information handling system at current access point. In an embodiment, wireless link signal performance may be detected based on QoS metrics detected at the user information handling system or at the current AP according to various embodiments herein. In an embodiment, roaming may be detected as the information handling system 300 is about to disconnect from the access point because it is about to go out of range from the current access point. At block 510, the method 500 may transmit current access point report including neighborhood radiofrequency band and channel report to the WLAN discovery and connection agent 339 and the WLAN QoS and antenna tuning management module 330 at an information handling system. In an embodiment, the current access point report may be transmitted using the FILS discovery frames. Thereafter, the method 500 may determine that the user information handling system has signal degradation according to embodiments herein or is roaming at the WLAN QoS and antenna tuning management module 330 requiring potential assessment of an alternative band, channel and access point for Wi-Fi connectivity. In an embodiment, the WLAN QoS and antenna tuning management module 300 may detect roaming in response to the current neighborhood access point report received therein.

At block 514, the method 500 determines a new AP and select an optimal channel and radiofrequency band for that neighbor AP having a clean channel with sufficient uplink score or channel rating in accordance with embodiments described herein when a neighbor AP is to be selected over a current AP. The selected channel and radiofrequency band of a neighbor AP may be selected further based on AP channel scoring as well as match to antenna tuning and radio selection configurations available at the user information handling system based on local telemetry received by the WLAN QoS and antenna tuning management module 330. In a further aspect, the method 500 may transfer a wireless link communication with the user information handling system from the current access point to the neighboring access point at the new, selected radiofrequency band and channel. In an embodiment, the communication may be transferred by the WLAN QoS and antenna tuning management module 300 and the antenna controller 324 transmitting a signal to the wireless adapter radio subsystem 308 and antenna tuning controls 321 and 323 to select an antenna, change the band/channel, and adjust the antennas to a configuration for reduced signal reflection or loss and any directionality adjustments. Similarly, the OCE-MBO IE frames of the information handling system may be used to trigger the change between the current AP and the neighbor AP as coordinated in communications among the current and neighbor AP and conducted in part by the WLAN discovery and connection agent, such as a Dell® Express Connect software, operating on the user information handling system to coordinate authorization and access to the neighbor AP. Thereafter, the method 500 may end.

Figure 6:
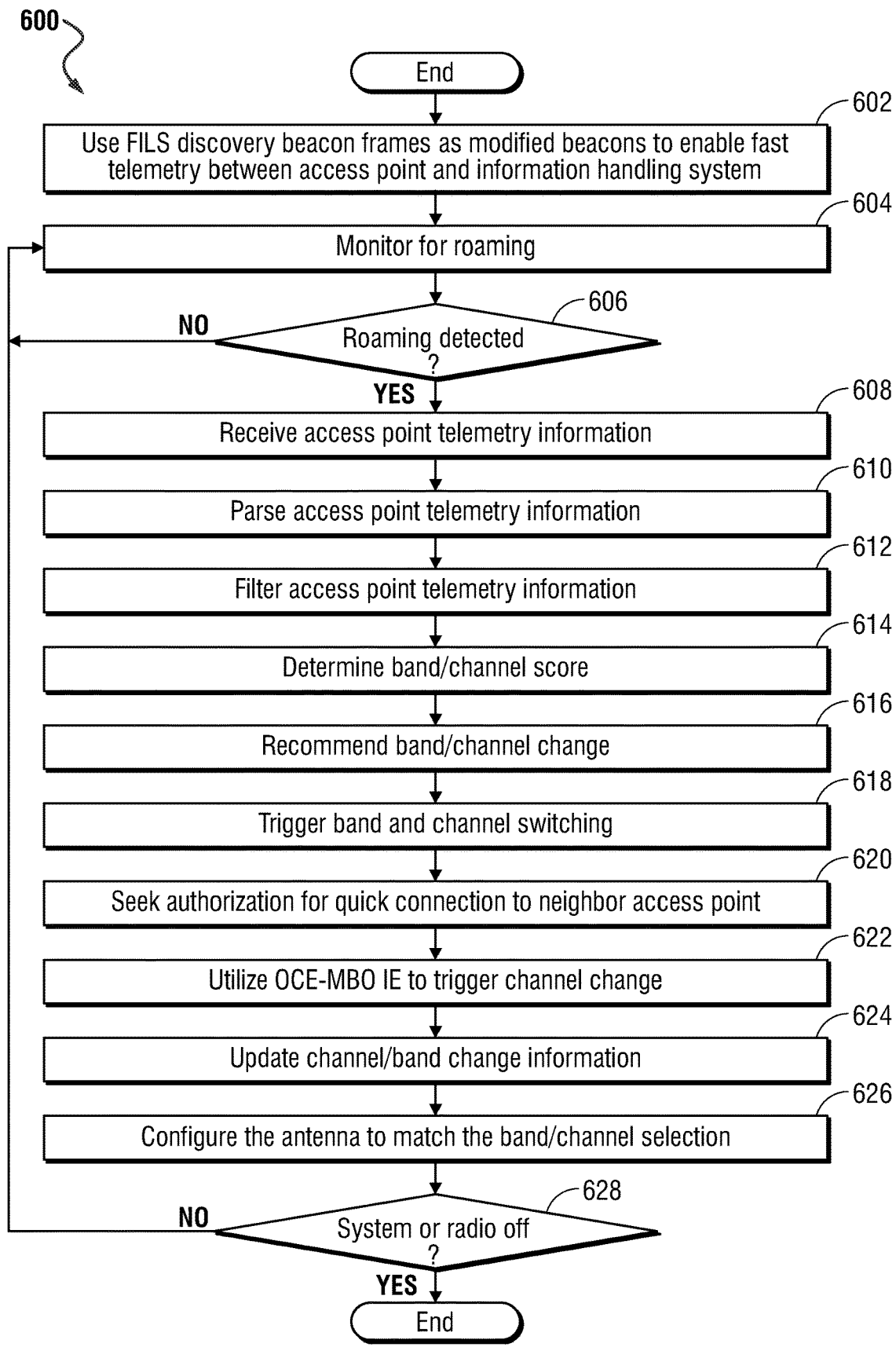
FIG. 6 is a flow diagram illustrating a method of tuning antennas within an information handling system according to another embodiment of the present disclosure.

FIG. 6 is a flow diagram illustrating a method of tuning antennas within a user information handling system according to another embodiment of the present disclosure where the user information handling system is detected as roaming or has detected signal degradation of its active wireless link. In FIG. 6, the method is generally designated 600. Beginning at block 602, the method 600 may receive FILS discovery beacon frames pursuant to WLAN protocol standards at the WLAN discovery and connection agent at a user information handling system. The FILS discovery beacon frames may be mini beacons and modified to enable fast telemetry between the current access point and the information handling system 300. In an embodiment, the FILS discovery beacon frames may be used for passive AP discovery and the WLAN discovery and connection agent, such as Dell® Express Connect, may be used to conduct authorization may be performed between the information handling system 300 and the current access point. The FILS discovery beacon frames are broadcast by the current AP (and other APs in some embodiments) at four times the beacon interval of other WLAN frames and may thus enable fast AP telemetry between the current access point and the information handling system 300 to substantially reduce the duration of periods of low-quality signal and fast closed-loop control with AP telemetry data via the WLAN QoS and antenna tuning management module 330 according to embodiments herein.

Moving to block 604, the method 600 may monitor the information handling system 300 for roaming. At decision 606, the method 600 may determine if roaming is occurring or if signal degradation has occurred beyond a threshold tolerance level. In an embodiment, roaming occurs when the information handling system 300 is about to disconnect from the current access point and connect to a neighboring access point. At decision 606, if roaming or signal degradation is not occurring, the method 600 may return to block 604 and the method 600 may continue to monitor the information handling system 100 for roaming or signal degradation as described above. In one embodiment, the WLAN discovery and connection agent 339 may operate with a backend network management system to coordinate roaming for a user information handling system among a plurality of neighborhood APs managed by the backend network management system. For example, a Dell® Express Connect system may be utilized.

Conversely, at decision 606, if roaming is detecting, the method 600 may proceed to block 608. At block 608, the method 600 may receive access point telemetry information. For example, the access point telemetry information may be received at the antenna controller 324 and the WLAN QoS and antenna tuning management module 330 from the FILS discovery beacon frames with antenna telemetry data by the WLAN discovery and connection agent within the information handling system 300. This may be fast AP telemetry data and reflect current AP and neighboring AP conditions. Additional AP telemetry data establishing frequency bands and channels may be provided via other WLAN data frames received at the user information handling system such as OCE-MBO IE frames for example. The access point telemetry information may include channel utilization, Wi-Fi noise, dynamic bandwidth selection, congestion, latency, switching, or a combination of other AP telemetry data. In one example embodiment, a backend network management system managing plural APs may be notified that the user information handling system is roaming and may recommend a band or channel change and a different neighbor AP.

At block 610, the method 600 may parse the access point telemetry information. In an embodiment, WLAN discovery and connection agent 339 may parse the access point telemetry information from AP discovery information and provide that AP telemetry data, such as a neighborhood AP radiofrequency and channel reporting of above data to the antenna controller 324 for use by a WLAN QoS and antenna tuning management module 330.

At block 612, the method 600 may filter the access point telemetry information. In an embodiment, the antenna controller 324 within the information handling system 300 may sort the access point telemetry information based on type of information.

Proceeding to block 614, the method 600 may determine a new band/channel from among the available neighboring APs. For example, the antenna controller 324 within the information handling system 300 may determine the new band/channel based on system specific antenna and power information on the user information handling system as well as from the received AP telemetry data. Specifically, in an embodiment, the network controller 306 executing some or all of the WLAN QoS and antenna tuning management module 330 may score frequency bands and channels among neighborhood APs recommend the band/channel change for a new neighbor AP in view of the roaming determination or the determination of wireless signal degradation. The band/channel score may include assessment of channel occupancy, wireless link noise levels on the channel, latency, congestion or other factors as well as range or distance of an AP and directionality. A plurality of bands and channels may be scored similarly to determine aspects such as uplink availability indicating how clean the channels are from traffic and latency as well as the radio QoS conditions at the APs. In some embodiments, the band/channel scoring is also modified by accounting for local telemetry from the wireless adapter radio subsystems and integrated sensor hub determinations of available antenna tuning and radio configurations available to utilize the AP bands and channels available. This is conducted as well by the antenna controller 324 executing some or all of the WLAN QoS and antenna tuning management module 330 in concert with other components of the user information handling system 300.

Moving to block 616, the method 600 may recommend a band/channel change. This is done upon comparison of the band/channel scored available wireless links by the WLAN QoS and antenna tuning management module 330 to determine a wireless link radiofrequency band and channel as well as the neighbor AP to select to accommodate current conditions of the radios and antennas or available tuning for the antennas at the user information handling system.

Thereafter, at block 618, the method 600 may trigger band and channel switching to a different neighbor AP based on the detected roaming or channel degradation of a wireless link with the current AP. For example, in an embodiment, the WLAN QoS and antenna tuning management module 330 within the information handling system 300 may trigger the band switching. At block 620, the method 600 may seek authorization for connectivity to the neighbor AP. For example, the WLAN discovery and connection agent on the user information handling system may be triggered to execute a quick connectivity operation for authorization to establish a wireless link to the neighbor AP. In one embodiment, such authorization may utilize a system such as the Dell® Express Connect system. In an embodiment, the authorization system of neighbor APs for expedited connection and roaming detection may utilize backend WLAN network management system.

Moving to block 622, the method 600 may utilize OCE-MBO IE frame to trigger a channel change or channel selection at a new, selected neighbor AP. In an embodiment, the current access point connected to the information handling system 300 may use the OCE-MBO IE frame to trigger the channel change. Then, at block 624, the method 600 may update channel/band change information. For example, the current access point connected to the information handling system 300 may transmit the updated channel/band change information to the radio controller 316 within the information handling system 300. At block 626, the method 600 may configure the antenna to match the band/channel selection. Specifically, the radio controller 316 within the information handling system 300 may transmit a signal to the antenna tuning controls 321 and 323 within the information handling system 300 in order to configure the antennas 320 and 322 to match the band/channel selection for the neighbor access point being operatively coupled to the information handling system 300 with respect to adjustments for signal loss/reflection optimization of the antennas or with respect to signal directionality adjustments to be made at the antennas to accommodate the new, neighbor AP. The antenna tuning controls may operate according to embodiments herein and may include tunable RLC matching circuits, utilization of parasitic elements, phase shifting of signals provided to the antenna systems or other systems to tune modification the signal loss efficiency profile for the multi-band capable antennas or directionality of these antennas according to various embodiments.

The method 600 may proceed to block 628 where it is determined if the user information handling system or the radio systems thereon are powered off. If not, the method 600 may return to block 604 to monitor for roaming or degradation of signal quality of the currently-linked AP and with the current radio subsystems and antenna configuration and tuning. Telemetry data may be received from the AP as well as local telemetry and the WLAN QoS and antenna tuning management module may proceed under method 600 as described to determine if a change in band or channel selection to a new, neighbor AP is required due to roaming or signal degradation. If the system or radio systems do power down at block 628, then the method 600 may end.

The blocks of the flow diagrams of FIG. 4 through FIG. 6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Information handling systems, modules, resources, or programs that are in communication with one another need not be in continuous communication with each other, unless expressly specified otherwise. In addition, information handling systems, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
   a processor, a memory, and a power management unit (PMU);
   an antenna controller of a wireless adapter operatively coupled to at least one tunable antenna and executing antenna control to adjust for antenna signal matching or antenna signal directionality;
   the antenna controller executing code instructions for a wireless local area network (WLAN) quality of service (QOS) and antenna tuning management module configured to receive access point (AP) telemetry information from a wireless AP via a fast initial link setup (FILS) discovery beacon frame including the AP telemetry information and to receive local telemetry relating to antenna radio channels, radio QoS conditions, and power levels;
   the antenna controller executing code instructions for the WLAN QoS and antenna tuning management module determine a band/channel score for a plurality of radio frequency bands and channels available for the wireless adapter based on the received AP telemetry information; and
   the antenna controller to trigger a band or antenna switching in accordance the band/channel score from the received AP telemetry data.

2. The information handling system of claim 1, wherein the band/channel score is determined from channel utilization levels, congestion/latency levels, or Wi-Fi noise levels in received AP telemetry data to assess a channel uplink score relating to channel occupancy for one or more channels on the one or more wireless APs.

3. The information handling system of claim 1, further comprising:
   the processor executing code instructions of a WLAN discovery and connection agent to receive the FILS discovery beacon frames and parse the AP telemetry data from the FILS discovery beacon for use to determine the band/channel score for the plurality of radio frequency bands and channels available for the wireless adapter.

4. The information handling system of claim 1, wherein WLAN QoS and antenna tuning management module determines from the one or more wireless APs that a channel degradation of a wireless link has occurred to a threshold level with a current AP before commencing to trigger the band or antenna switching in accordance the band/channel score from the received AP telemetry data.

5. The information handling system of claim 1, wherein the WLAN QoS and antenna tuning management module transmits the band or antenna switching as part of an optimized connectivity-multiband operation information element (OCE-MBO IE) frame to the current AP.

6. The information handling system of claim 1, further comprising:
   the antenna controller executing the WLAN QoS and antenna tuning management module is configured to receive the AP telemetry information from the wireless AP in beacon payload data in flexible data-rate capability and access network options (ANO) fields of the FILS discovery beacon frames.

7. The information handling system of claim 1, further comprising:
   the antenna controller executing the WLAN QoS and antenna tuning management module is configured to receive the AP telemetry information from a currently-connected wireless AP and a neighbor wireless AP in beacon payload data in a plurality of the FILS discovery beacon frames to determine the band/channel score for the plurality of radio frequency bands and channels available for the wireless adapter to access one or more wireless APs based on the received AP telemetry information.

8. The information handling system of claim 1, further comprising:
   an antenna tuning control at the at least one tunable antenna to adjust the signal matching with the at least one tunable antenna to accommodate the band/channel change determined by the WLAN QoS and antenna tuning management module at the antenna controller.

9. The information handling system of claim 8, wherein antenna tuning control includes adjustment to an antenna feed matching circuit to reduce antenna loss at the at least one tunable antenna.

10. The information handling system of claim 1, further comprising:
    an antenna tuning control at the at least one tunable antenna to adjust the signal directionality for the at least one tunable antenna to accommodate the band/channel change determined by the WLAN QoS and antenna tuning management module at the antenna controller.

11. A method implemented at an information handling system comprising:
    receiving access point telemetry information from one or more wireless access points (APs) when signal quality degradation is detected for a wireless link with a current AP, wherein the AP telemetry information is received within a fast initial link setup (FILS) discovery beacon frame payload data for reporting of fast AP telemetry conditions;

determine a band/channel score, via an antenna controller, for a plurality of radio frequency bands and channels available for a wireless adapter on the information handling system to access the one or more wireless APs based on the received AP telemetry information;

comparing the band/channel score for the plurality of radio frequency bands and channels available for the wireless adapter to access the one or more wireless APs with determined wireless adapter and antenna conditions including tunable states of at least one tunable antenna; and executing an antenna tuning control at the at least one tunable antenna to adjust the signal matching with the at least one tunable antenna at least partially based on the band/channel score to accommodate a band/channel change determined by code instructions for a wireless local area network (WLAN) quality of service (QoS) and antenna tuning management module executed via an antenna controller.

12. The method of claim 11, wherein the band/channel score is determined from channel utilization levels, congestion/latency levels, or Wi-Fi noise levels in received AP telemetry data to assess a channel uplink score relating to channel occupancy for one or more channels on the one or more wireless APs.

13. The method of claim 11, further comprising:
receiving the FILS discovery beacon frames and parsing the AP telemetry data from beacon payload data in flexible data-rate capability and access network options (ANO) fields of the FILS discovery beacon frames via a processor executing code instructions of a WLAN discovery and connection agent.

14. The method of claim 11, wherein the antenna tuning control includes adjusting a variable resistor-inductor-capacitor (RLC) matching circuit to adjust the signal loss profile for the at least one tunable antenna.

15. The method of claim 11, wherein the antenna tuning control includes adjusting signal directionality for the at least one tunable antenna based on the received AP telemetry data.

16. The method of claim 11, wherein receiving the AP telemetry information includes payload data from plural FILS discovery beacon frames for a currently-connected wireless AP and a neighbor wireless AP in beacon payload data to determine the band/channel score for the plurality of radio frequency bands and channels available for the wireless adapter to access one or more wireless APs based on the received AP telemetry information.

17. An information handling system comprising:
a processor, a memory, and a power management unit (PMU);
a wireless adapter including a radio subsystem and radio front end;
at least one tunable antenna operatively coupled to an antenna tuning controller to adjust for antenna signal matching or antenna signal directionality;
the antenna controller executing code instructions for a wireless local area network (WLAN) a quality of service (QOS) and antenna tuning management module configured to:
receive access point (AP) telemetry information from one or more neighbor wireless APs when roaming of the information handling system from a current AP is detected, wherein the AP telemetry information is received within data payload of a fast initial link setup (FILS) discovery beacon frame;
determine a band/channel score for a plurality of radio frequency bands and channels available for the wireless adapter to access the one or more neighbor wireless APs and to access the current AP based on the received AP telemetry information; and
determine a recommendation for a band/channel change to a first of the neighbor wireless APs from the current AP for the wireless adapter;
the antenna controller to trigger a band or antenna switching at the wireless adapter via a tuning signal to tune the at least one tunable antenna in accordance with the recommendation for the band/channel change.

18. The information handling system of claim 17, wherein the antenna controller operatively coupled to the at least one tunable antenna is configured to adjust signal matching for the tunable antenna to adjust a signal power loss profile to reduce signal loss with the band and channel selected by the band/channel change.

19. The information handling system of claim 17, wherein the antenna controller operatively coupled to the at least one tunable antenna is configured to adjust signal directionality for the tunable antenna to adjust a signal direction to the first neighbor AP with the band and channel selected by the band/channel change.

20. The information handling system of claim 17, further comprising:
at least two tunable antennas; and
antenna controller to trigger the band or antenna switching at the wireless adapter with selection of the radio subsystem and the selection among the at least two tunable antennas for the band/channel change.

* * * * *